United States Patent
Flowers et al.

(10) Patent No.: US 7,128,839 B1
(45) Date of Patent: Oct. 31, 2006

(54) PROCESS AND SYSTEM FOR ENHANCED NITROGEN REMOVAL IN A WETLAND AND RECIRCULATING SAND FILTER WASTEWATER TREATMENT SYSTEM

(76) Inventors: David A. Flowers, 668 Martin Dr., P.O. Box 65, Cedarburg, WI (US) 53012-0065; Thomas E. Vik, N3068 Reiland Rd., Appleton, WI (US) 54913

(*) Notice: Subject to any disclaimer, the term of this patent is extended or adjusted under 35 U.S.C. 154(b) by 53 days.

(21) Appl. No.: 10/794,611

(22) Filed: Mar. 5, 2004

(51) Int. Cl.
*C02F 3/06* (2006.01)
*C02F 3/32* (2006.01)

(52) U.S. Cl. .................. 210/602; 210/617; 210/259; 210/903

(58) Field of Classification Search .............. 210/602, 210/615, 616, 617, 621, 252, 259, 903, 170
See application file for complete search history.

(56) References Cited

U.S. PATENT DOCUMENTS

| | | | |
|---|---|---|---|
| 5,690,827 A * | 11/1997 | Simmering et al. | 210/602 |
| 5,893,975 A | 4/1999 | Eifert | 210/602 |
| 6,126,827 A | 10/2000 | Johnson, Jr. et al. | 210/602 |
| 6,159,371 A | 12/2000 | Dufay | 210/602 |
| 6,200,469 B1 | 3/2001 | Wallace | 210/150 |
| 6,447,681 B1 * | 9/2002 | Carlberg et al. | 210/602 |
| 6,447,682 B1 * | 9/2002 | Flowers | 210/602 |
| 6,531,062 B1 * | 3/2003 | Whitehill | 210/602 |
| 6,558,555 B1 * | 5/2003 | Flowers | 210/747 |
| 6,582,156 B1 | 6/2003 | Flowers | 405/41 |
| 6,858,142 B1 * | 2/2005 | Towndrow | 210/602 |

FOREIGN PATENT DOCUMENTS

| | | | |
|---|---|---|---|
| JP | 58-70891 | * | 4/1983 |
| JP | 8-66676 | * | 3/1996 |

* cited by examiner

*Primary Examiner*—Fred G. Prince
(74) *Attorney, Agent, or Firm*—Whyte Hirschboeck Dudek SC

(57) ABSTRACT

A process and system for enhanced nitrogen removal in a wastewater treatment facility comprises a constructed wetlands and a recirculating sand filter. The effluent from the constructed wetlands passes through the recirculating sand filter to facilitate ammonia conversion to nitrates. A portion of the wastewater is recycled from the recirculating sand filter to the constructed wetlands to provide for anaerobic denitrification of the wastewater in a nutrient rich environment.

9 Claims, 3 Drawing Sheets

PROCESS AND SYSTEM FOR ENHANCED NITROGEN REMOVAL IN A WETLAND AND RECIRCULATING SAND FILTER WASTEWATER TREATMENT SYSTEM

BACKGROUND OF THE INVENTION

The present invention relates to a process and system for treating wastewater in a constructed wetland facility.

The use of constructed wetlands for the treatment of wastewater is becoming an increasingly popular option especially in rural or lightly developed areas. Constructed wetlands use wetland plants and bacteria to remove pollutants from the wastewater.

Existing constructed wetlands, including surface water and subsurface flow systems, use wetland plants and atmospheric diffusion to transfer oxygen into the water. At the inlet to the constructed wetlands, the high concentration of organic matter in the wastewater provides a rich energy source for biological activity. This activity is so vigorous that any oxygen transferred into the water is immediately consumed resulting in an essentially oxygen-free (anaerobic) zone. The organic material is consumed by the biological activity so that, as the wastewater flows through the wetland, the concentration of organic matter is rapidly reduced. The reduction in the energy source represented by the organic matter reduces the rate of microbiological activities such that an anoxic regime is formed wherein the oxygen transferred into the water is not necessarily immediately consumed but the water is still oxygen starved. The plants and water surface can provide natural aerobic zones within the constructed wetland, especially in the anoxic zone. These aerobic zones provide for efficient conversion of ammonia or ammonium ions into nitrates. The nitrates are bacteriologically reduced to nitrogen gas but such microbiological activity is inhibited by the presence of free oxygen in the aerobic zones and the anoxic zones.

A number of processes and systems have been developed to increase the aerobic activity in a constructed wetland to improve the conversion of ammonia/ammonium to nitrates. For example, U.S. Pat. No. 5,893,975 discloses a subsurface flow constructed wetland including a wastewater treatment system having a flow intake, a pretreatment nutrient addition chamber and a wastewater flow divider. The flow divider further has a compressed air aerator in the bottom thereof. An object of the invention of U.S. Pat. No. 5,893,975 is to install a supplemental air diffuser system along the bottom of the influent distribution chamber therein to facilitate initial precipitation of sludge and to prevent potential septic and/or anaerobic conditions at the initial point of treatment to significantly enhance system performance.

U.S. Pat. No. 6,126,827 discloses a wastewater treatment system wherein the liquid component is subjected to a two-part treatment wherein the first part of the treatment is carried out on a sequencing batch reactor and the second part is carried out in at least one reed bed. The wastewater entering the reed bed is comparable in quality to secondary treated wastewater except that a substantial amount of total nitrogen has also been removed.

U.S. Pat. No. 6,159,371 discloses constructed wetlands, utilizing a plurality of cells, in which nitrification and denitrification occurs simultaneously at low flow rates and lower temperatures. The constructed wetland provides improved remediation in a shorter period of time.

U.S. Pat. No. 6,200,469 B1 discloses a system for removing pollution from water, utilizing a subsurface constructed wetland system using forced bed aeration and variable water levels, to promote greater root depth and better root structure of the wetland vegetation, and to establish staged anaerobic and aerobic zones within the system.

A system combining a wetlands and a recirculating sand filter in series has been developed to enhance nitrogen removal. However, this system requires the addition of a second nutrient feed stream after the sand filter.

None of the prior art systems provide for denitrification of the wastewater in a highly anaerobic, nutrient rich zone near the inlet of the constructed wetlands. It is a hallmark of the current invention to provide for denitrification of wastewater in the anaerobic nutrient rich zone at the inlet to the constructed wetland.

SUMMARY OF THE INVENTION

The present invention provides a process and system for enhanced nitrogen removal in a wetland wastewater treatment facility that overcomes the aforementioned problems.

In one preferred embodiment, the invention is a wastewater treatment system comprising a constructed wetland comprising a reservoir defining a flow channel for the wastewater, the wastewater at least partially filling the reservoir, an inlet end where wastewater to be treated is introduced into the reservoir and an outlet end where water is discharged from the reservoir, wherein the water flows from the inlet end toward the outlet end. The system also comprises a recirculating sand filter having at least one inlet and at least one outlet, wherein an inlet of the recirculating sand filter is in fluid communication with the outlet end of the reservoir. The system further comprises a recycle system providing fluid communication from the outlet of the recirculating sand filter to the inlet end of the wetlands reservoir and means to move water through the recycle system from the outlet of the recirculating sand filter to the inlet end of the wetlands reservoir.

In another preferred embodiment, the invention comprises a process for improved nitrogen removal from wastewater. The inventive process comprises the steps of providing a constructed wetland having an inlet end and an outlet end, the wetlands adapted to facilitate flow of wastewater from the inlet end to the outlet end and a recirculating sand filter having an inlet and an outlet. Wastewater is introduced to the wetland at or proximate to the inlet end of the constructed wetland, the wastewater comprising nitrogen containing organic material. The wastewater from the outlet end of the wetland is transferred to the inlet of the recirculating sand filter. Water drains from the outlet of the recirculating sand filter and some of the drained water is recirculated to the inlet end of the wetland.

Various other features, objects and advantages of the present invention will be made apparent from the following detailed description and the drawings.

BRIEF DESCRIPTION OF THE DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts.

In the drawings.

DETAILED DESCRIPTION OF THE PREFERRED EMBODIMENT

In the following detailed description, references made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention.

Figure 1:
FIG. 1 is a process flow chart of a typical constructed wetland wastewater treatment system.
Figure 2:
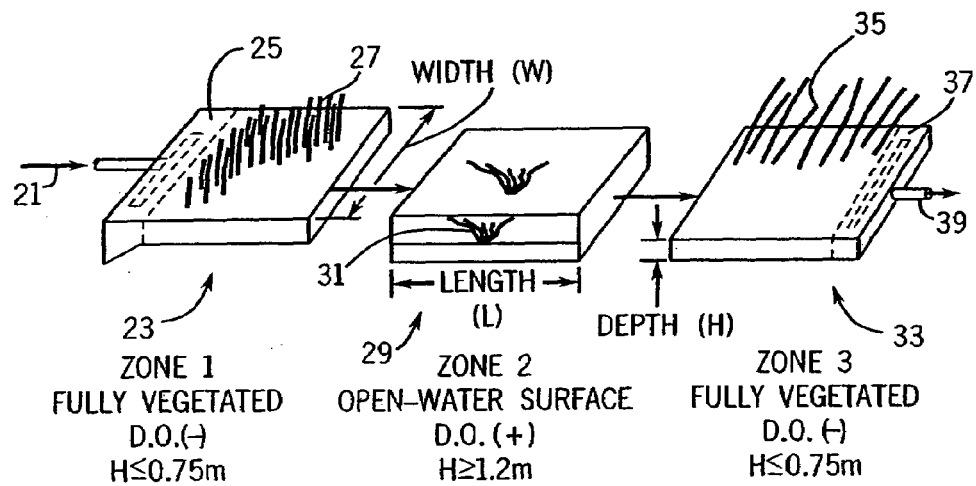
FIG. 2 is an exploded view of a typical free water surface constructed wetland.
Figure 3:
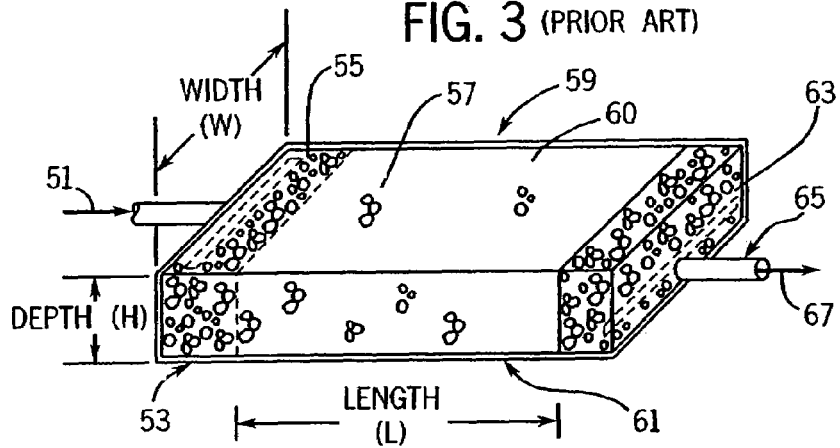
FIG. 3 is a perspective view of a typical vegetated submerged bed constructed wetland.

FIG. 1 shows the process flow of a typical wastewater treatment system comprising a constructed wetland. Raw wastewater 1 goes into a primary treatment system 3 where solids may be removed by settling. Primary effluent 5 is transferred from primary treatment 3 to the constructed wetland 7, where the wastewater is treated through the wetland and exits the wetland as secondary effluent 9. The secondary effluent 9 may be disinfected or tertiary treated 11 to form the final discharge 13. Typical constructed wetlands are shown in FIGS. 2 and 3. FIG. 2 shows the elements of a free water surface constructed wetland. Influent 21 enters zone 23 of the wetland through inlet settling zone 25. The wastewater flows through floating and emergent plants 27 to reach the second zone 29. Submerged growth plants 31 in the second zone 29 provide for further treatment of the wastewater which then flows to a third zone 33. Floating and emergent plants 35 provide oxygen and nitrogen transfer for the final treatment of the wastewater which then flows into outlet zone 37 and discharges through variable level outlet 39.

FIG. 3 shows the elements of a vegetated submerged bed system. Pretreated influent 51 flows into the wetland which is contained within liner 53. The influent is distributed through the wetland in inlet zone 55. The wetland has a top slope 57 which typically is flat with no grade. The wetland also has bottom slope 61 which is generally less than or equal to 1% grade moving downward from inlet zone 55 to outlet zone 63. Treatment zone 59 is typically filled with media 60. The media 60 may be sand, rocks and plant roots. The wastewater flows through the media 60 to outlet zone 63 and from there through the variable outlet 65 the effluent 67 is discharged.

In either the free water surface constructed wetland or the vegetated submerged bed wetland, the influent 21 or 51, respectively, enters the wetland with a heavy organic material load (represented by a high biochemical oxygen demand (B.O.D.)) comprising proteins, urea and other organic nitrogen sources. Bacteria convert the nitrogen from the proteins and urea into ammonia or ammonium ions. The high concentration of organic material fuels the microbiological reactions such that no free oxygen is present and the wastewater near the inlet is substantially anaerobic. As the wastewater flows through the wetland and the organic material is consumed, some free oxygen is available and the wastewater is considered anoxic. In the anoxic zone, ammonia and ammonium is converted to nitrites and nitrates. The nitrites rapidly oxidize to nitrates.

These soluble nitrates will exit the wetlands with the effluent in unacceptably high concentrations unless denitrified. Denitrification is a microbiological process which converts the nitrate into nitrogen gas. The denitrification process is inhibited by the presence of free oxygen and therefore occurs relatively slowly in the anoxic wastewater of the wetlands. Moreover, the anoxic zone is significantly depleted of the organic material necessary to fuel the biochemical reactions. Prior art systems that aerate the wastewater in the wetlands provide oxygen that aids the conversion of ammonia to nitrate. However, because these prior art systems tend to add the air throughout the wetlands or at the inlet to the wetlands, the oxygen curtails the denitrification reaction.

Recirculating sand filters (RSF) are also used in wastewater treatment systems. RSF systems are aerobic systems which normally provide good conversion of ammonia and ammonium to nitrates. Additionally, the filter media provides further screening and sedimentation of solids, limited chemical sorption and a surface for bioslimes.

Figure 4:
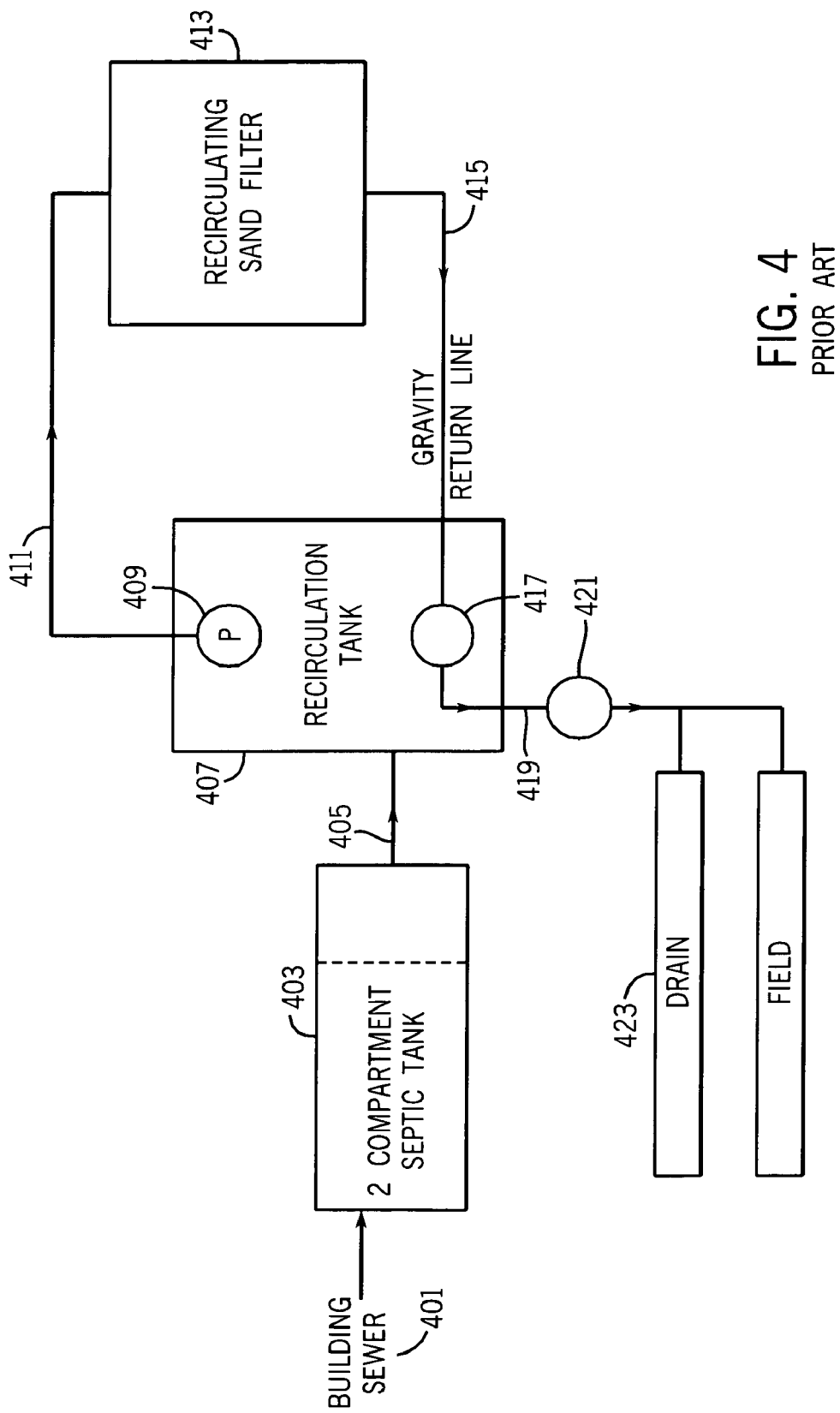
FIG. 4 is a schematic view of a typical recirculating sand filter.

A typical prior art RSF system is shown in FIG. 4. Raw sewage 401 flows into a 2-compartment septic tank 403 where much of the solids is removed. Effluent 405 from septic tank 403 flows into a recirculation tank 407. A pump 409, or similar means, moves a stream 411 of fluid from recirculating tank 407 to an RSF 413. The stream 411 is distributed across the surface of RSF 413 and percolates through the media of the filter. The RSF effluent stream 415 flows back to recirculation tank 407, preferably through a gravity return line. As shown, a flow splitter 417 may divert a portion of RSF effluent stream 415 to the drainfields as drain effluent stream 419. Alternatively, all of RSF effluent stream 415 may return to the recirculation tank 407 and drain effluent stream 419 would represent an overflow stream from the tank. A typical RSF system may include a drainfield pump chamber 421 which delivers the drain effluent stream 419 to drains 423.

The media used in an RSF is normally washed and graded sand but may also comprise gravel, anthracite, crushed glass, expanded shale, bottom ash from coal-fired plants, foam chips, peat and nonwoven coarse fibers.

Figure 5:
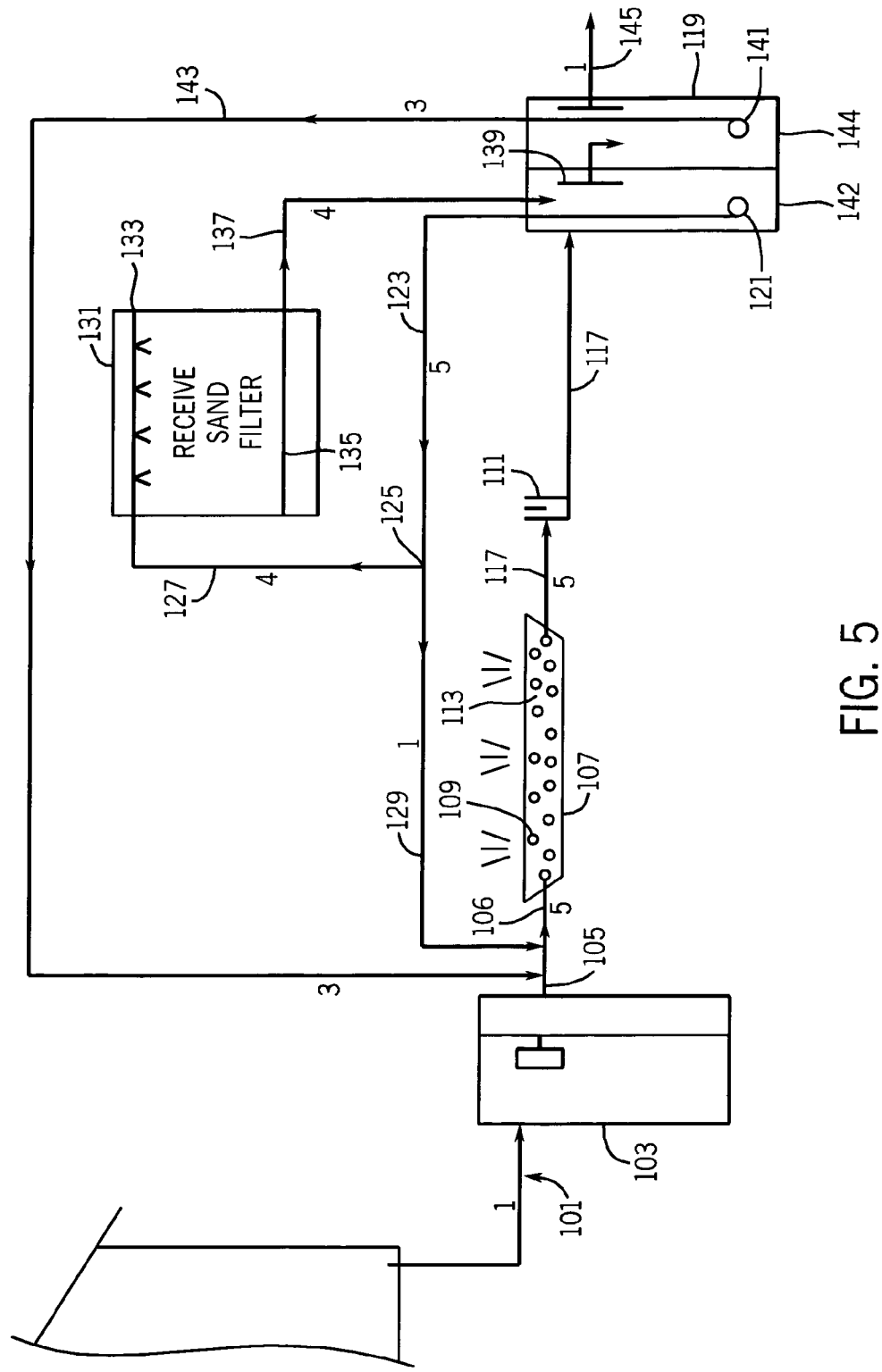
FIG. 5 is a process flow chart of the inventive constructed wetland wastewater and recirculating sand filter treatment system.

The enhanced nitrogen removal process of the current invention is illustrated in FIG. 5. Raw wastewater 101 enters an optional primary treatment 103. The primary effluent 105, or, alternatively, raw wastewater 101, enters as part of the influent 106 to constructed wetland 107. Except as further described herein, wetland 107 may be any type of wetland known in the art, for example, the wetland of FIG. 3. Wetland 107 comprises a reservoir which is at least partially filled with water. The water level is controlled by any level control structure 111 known in the art, preferably by the adjustable standpipe disclosed in U.S. Pat. No. 6,582,156 B1, incorporated herein by reference. Wetland 107 is functionally divided into an entry zone 109 and a discharge zone 113.

Effluent 117 proceeds to the recirculating sand filter 131. Entry zone 109 is an overall anaerobic zone. Overall anaerobic means that, on a macro scale, free oxygen is not present in the wastewater and reactions occur using the molecular oxygen of the reactants. One skilled in the art will recognize that there will be micro locations which would be characterized as either anoxic or aerobic. These micro locations are typically formed around sources of oxygen, such as plant roots or water surfaces. However, these anoxic and/or aerobic micro locations are of lesser impact compared to the function of the zone in total.

Discharge zone 113 is an overall anoxic zone. An overall anoxic zone is relatively oxygen-starved and little or no free oxygen will be available in the wastewater. Bacteria that thrive in an anoxic zone are able to fluctuate between anaerobic and aerobic metabolisms depending on the availability of free oxygen. As with the previous two zones, micro locations of aerobic activity and anaerobic activity will be present within the overall anoxic zone but are of lesser impact compared to the overall functioning of the anoxic zone.

Influent 106 has a high concentration of organic materials (i.e., a high BOD) comprising nitrogen containing organic compounds. When the wastewater with high organic concentration enters anaerobic zone 109, the nitrogen is microbially modified into ammonia or ammonium ions, depending upon the pH of the water. This creates a relatively high concentration of ammonia/ammonium in the wastewater of zone 109.

Typically, some denitrification occurs in the discharge zone 113. First, the ammonia is microbiologically modified into nitrite and nitrates. Then, further microbiological reactions occur to denitrify the wastewater. In denitrification, the enzyme nitrate reductase allows certain genera of bacteria to use the more tightly bound oxygen atoms of nitrate and nitrite molecules as the final electron acceptor. The most common facultative bacterial groups that accomplish denitrification include *Bacillus, Enterobacter, Micrococcus, Pseudomonas,* and *Spirillum*. These genera can switch easily from anoxic to aerobic metabolism because of the biochemical similarities of the two processes. However, because the use of free oxygen as the final electron acceptor (as in the Krebs cycle) yields more energy than the use of oxygen from nitrate, these organisms will typically not denitrify nitrate in the presence of free oxygen.

Therefore, the anoxic conditions of discharge zone 113 provide a rough compromise between the aerobic conditions necessary for ammonia conversion and the anaerobic conditions needed for nitrate/nitrite conversion. However, in general, the denitrifying bacteria do not completely remove the nitrates from the wastewater and so a certain amount of nitrates/nitrites exit the wetland 107 via effluent 117.

Effluent 117 from wetlands 107 flows into a recirculation tank 119. A pump 121, or similar means, moves a stream 123 of fluid from recirculating tank 119 to an RSF 131. The RSF 131 may be any type of RSF, such as that shown in FIG. 4.

Optionally, a flow splitter 125 may divide stream 123 into two streams: 127 and 129. Stream 127 proceeds to the RSF 131. Stream 129 proceeds to, and joins, effluent 105 to form part of influent 106.

The stream 127 is distributed across the surface of RSF 131 by a distribution system 133 and percolates through the media of the filter. The filtered wastewater is collected by an underdrain 135 and removed as RSF effluent stream 137. The RSF effluent stream 137 flows back to recirculation tank 119, preferably through a gravity return line. The RSF provides the aerobic environment necessary to favor the conversion of ammonia to nitrites and nitrates. The nitrites will readily oxidize to nitrates in the aerobic conditions of the RSF.

As shown, the recirculation tank 119 is preferably a combination tank with an RSF recirculation side 142 and a wetlands recirculation side 144. Wastewater transfers from RSF recirculation side 142 to wetlands recirculation side 144 by any suitable means 139, such as an overflow weir.

A pump, 141, or similar means, moves a stream 143 of wastewater, heavily loaded with nitrates, from wetlands recirculation side 144 to join effluent stream 105 to form part of influent stream 106. By recycling a stream 143 back into zone 109, the denitrification reaction is allowed to occur in an anaerobic zone which strongly favors the denitrification reaction. Moreover, because zone 109 is rich in organic nutrients, the denitrifying bacteria have a readily available food source to fuel the denitrifying reaction. As such, in the current invention, the predominant reactions in zone 109 are the conversion of nitrogen products to ammonia and the denitrifying nitrates to nitrogen gas.

Another effluent stream 145 moves wastewater from recirculation tank 119 to the drainfields as drain effluent stream 419.

Any practical recycle rate may be used in the practice of this invention. Recycle rate is defined as the amount of water recycled as a percentage of the total influent flow 101 from the wastewater source. As one skilled in the art will readily recognize, higher recycle rates will provide more improvement in denitrification than do low recycle rates. However, higher recycle rates require larger, more expensive equipment and treatment cells and have associated higher energy costs. Recycle rates up to 400%, or more, are acceptable for the purposes of the invention.

EXAMPLES

A system has been designed for a single-family residence producing an average volume of wastewater of 600 gallons/day (gpd). The wastewater flows into a septic tank to remove the solids and then enters a subsurface flow constructed wetlands. The wetlands is sized for a throughput of about 3000 gpd to allow for the recycle streams. Such a wetlands would be approximately 14 feet wide, 14 feet long and 1.5 feet deep. The wastewater stream passes from the wetlands to a recirculation holding tank. A stream of wastewater is recirculated from the holding tank through a sand filter. The RSF would be approximately 100 square feet in area and approximately 3 feet deep. The flow rate of the stream passing through the RSF is 2400 gpd. Another stream of wastewater is recycled back to the inlet of the wetlands. The recycle stream has a flow rate of 2400 gpd, (400% recycle rate). The expected characteristics of the wastewater stream exiting to the drainfields is:

Flow rate: up to 600 gpd
BOD: less than or equal to 5 mg/l
TSS: less than or equal to 10 mg/l
Ammonia: less than or equal to 2 mg/l
Nitrate: less than or equal to 2 mg/l
*e. coli*: less than or equal to 1000 cfu/100 ml In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wastewater treatment system comprising:
A) a constructed wetland comprising a reservoir defining a flow channel for the wastewater, the wastewater at least partially filling the reservoir, an inlet end where wastewater to be treated is introduced into the reservoir and an outlet end where water is discharged from the reservoir, wherein the water flows from the inlet end toward the outlet end;

B) a recirculating sand filter having at least one inlet and at least one outlet, wherein an inlet of the recirculating sand filter is in fluid communication with the outlet end of the reservoir;

C) a first recycle system providing fluid communication from the outlet of the recirculating sand filter to the inlet end of the wetlands reservoir; and, D) means to move water through the first recycle system from the outlet of the recirculating sand filter to the inlet end of the wetlands reservoir.

2. The treatment system of claim 1 wherein the recirculating sand filter comprises a tank, a filter bed and second recycle system providing fluid communication from the tank to the filter bed and back from the filter bed to the tank.

3. The treatment system of claim 2 wherein the tank comprises the inlet and the outlet of the recirculating sand filter.

4. The treatment system of claim 2 wherein the tank comprises at least a first tank reservoir and a second tank reservoir.

5. The treatment system of claim 2 further comprising a third recycle system providing fluid communication from the tank to the inlet of the wetlands reservoir.

6. A process for improved nitrogen removal from wastewater, the process comprising the steps of:

A) providing a constructed wetland having an inlet end and an outlet end, the wetlands adapted to facilitate flow of wastewater from the inlet end to the outlet end;

B) providing a recirculating sand filter having an inlet and an outlet;

C) introducing an influent stream of raw or primary treated wastewater to the wetland at or proximate to the inlet end of the constructed wetland, the wastewater comprising nitrogen containing organic material;

D) transferring the wastewater from the outlet end of the wetland to the inlet of the recirculating sand filter;

E) draining water from the outlet of the recirculating sand filter; and

F) recycling some of the water drained from the outlet of the recirculating sand filter to the inlet end of the wetland.

7. The process of claim 6 wherein the recirculating sand filter further comprises a tank and a filter bed and the process comprises the further steps of:

G) transferring wastewater from the tank to the filter bed;

H) allowing the wastewater to percolate through the filter bed; and,

I) transferring the percolated wastewater to the tank.

8. The process of claim 7 further comprising the step of:

J) diverting a portion of the wastewater being transferred in step G) as a recycle stream to the inlet of the wetlands.

9. The process of claim 6 wherein the total recycle rate is up to 400% of the influent stream.

* * * * *